Sept. 8, 1959  A. DUERKSEN  2,902,717
TIRE RETREADING MOLD WITH TREAD CENTERING MECHANISM
Filed April 29, 1957  4 Sheets-Sheet 3
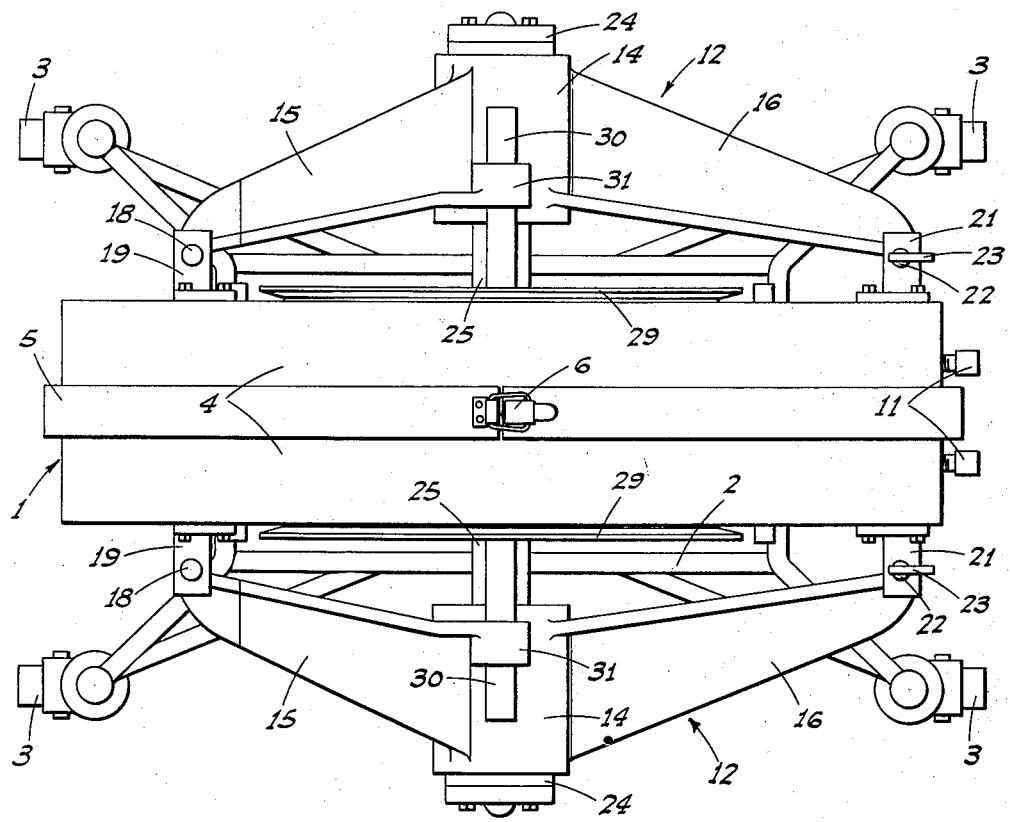
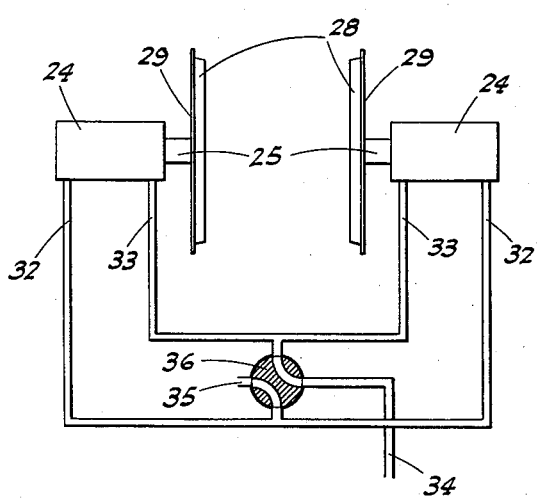
INVENTOR.
Arnold Duerksen
BY Webster & Webster
ATTYS.

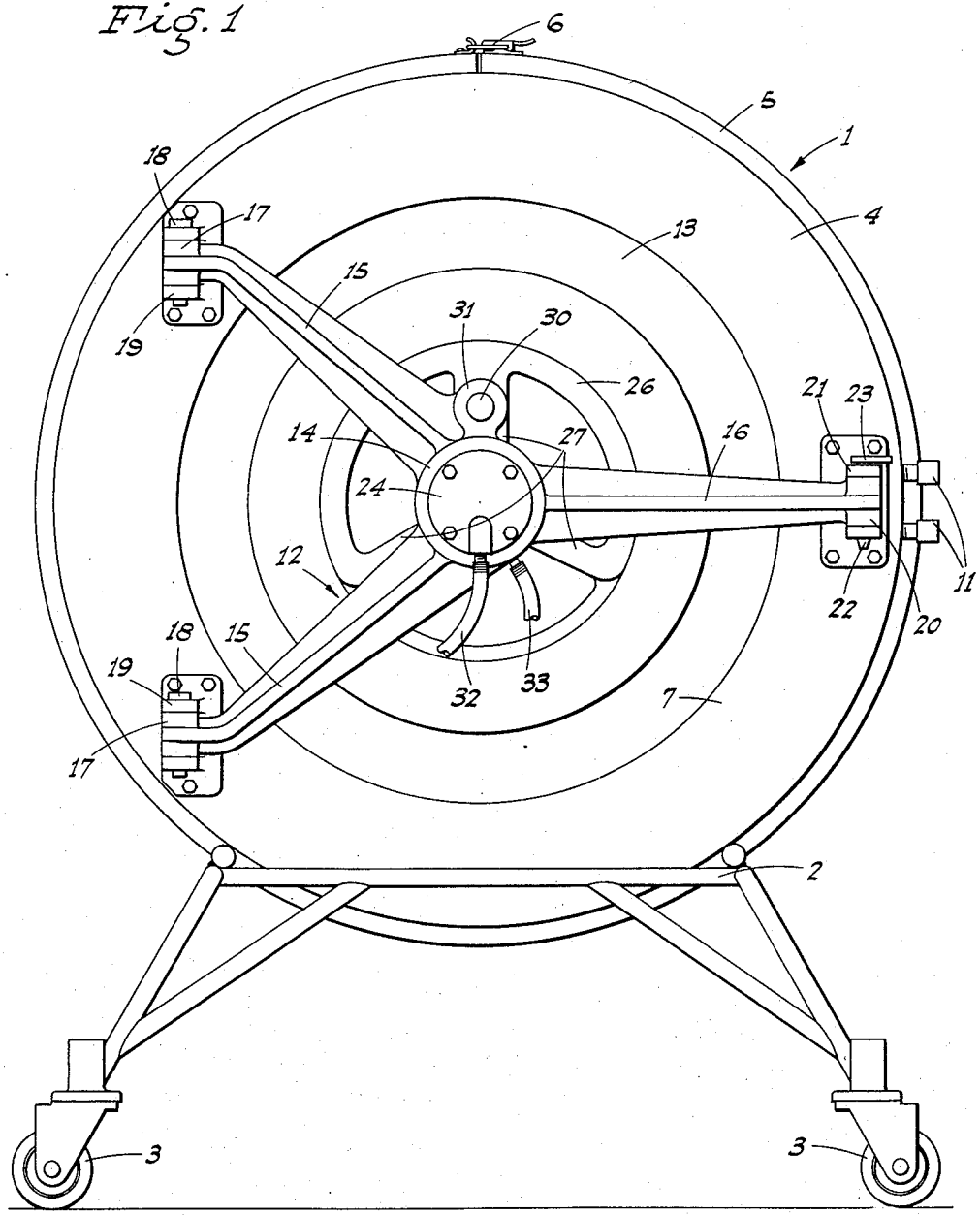

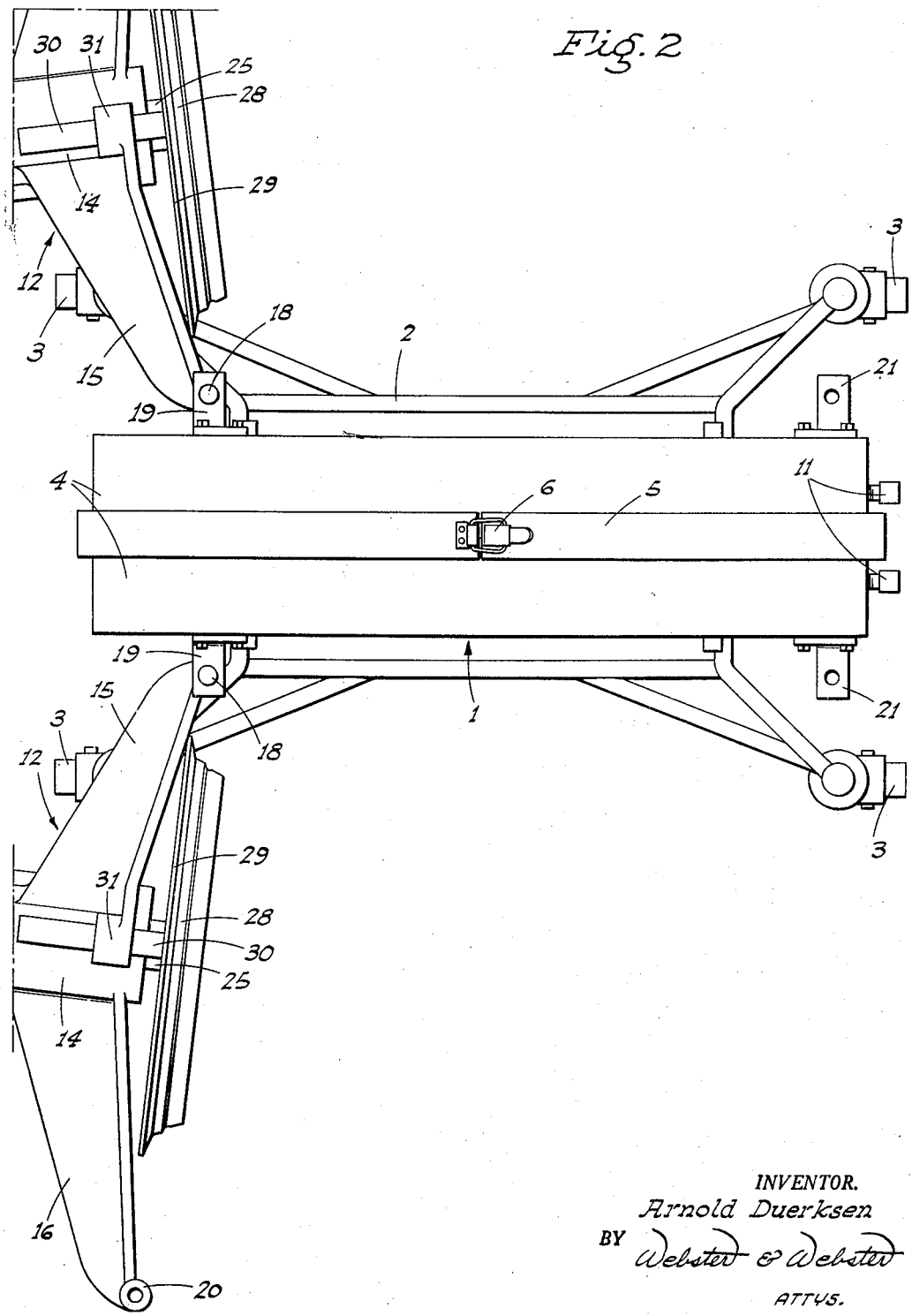

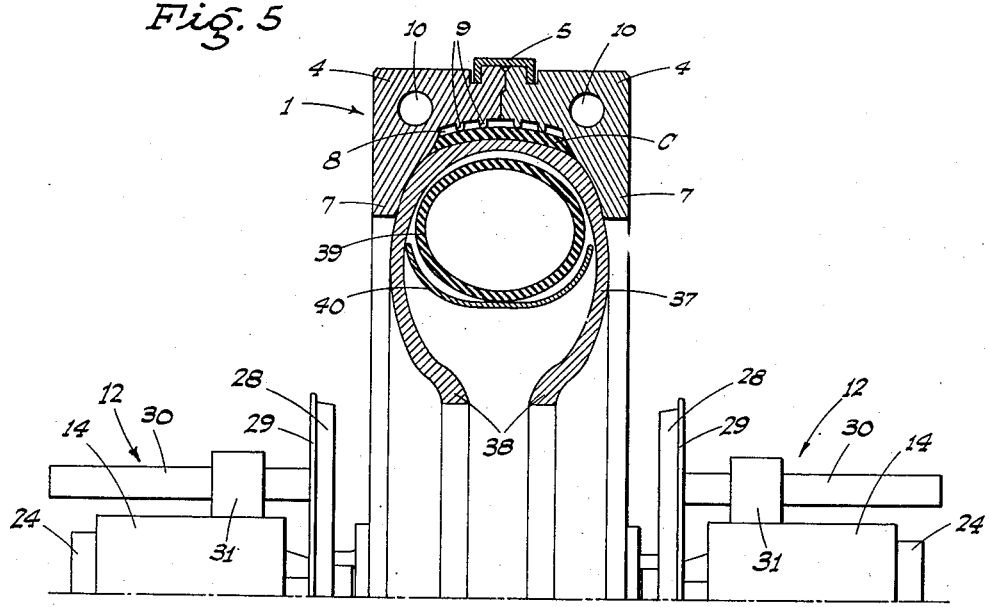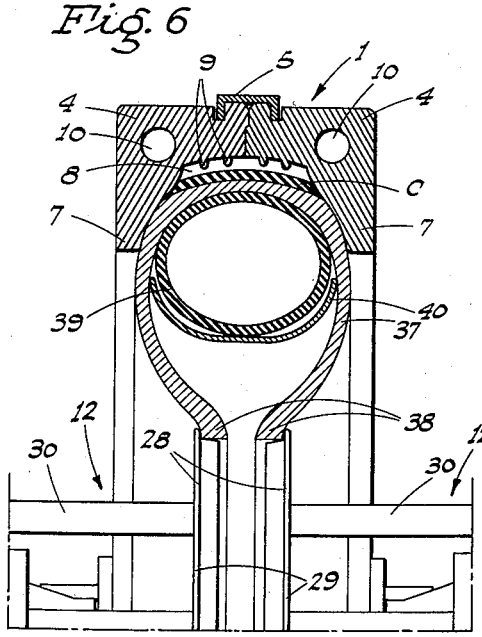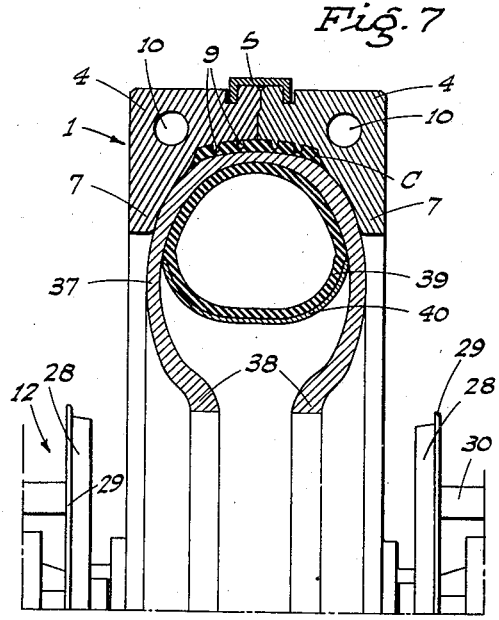

United States Patent Office
2,902,717
Patented Sept. 8, 1959

2,902,717

TIRE RETREADING MOLD WITH TREAD CENTERING MECHANISM

Arnold Duerksen, Lodi, Calif., assignor to Super Mold Corporation of California, Lodi, Calif., a corporation of California Application April 29, 1957, Serial No. 655,895

3 Claims. (Cl. 18—18)

This invention is directed to, and it is a major object to provide, an endless or band-type tire retreading mold and tread centering mechanism in novel combination.

After introduction of a prepared tire into the endless, tire receiving matrix cavity of such a mold, the new tread rubber or camelback on the tire is forcefully urged into the matrix design by means of an inside curing bag inflated in the tire and backed by an inside curing rim.

However, unless the tire beads are restrained against free and independent movement during such inflation of the inside curing bag, the tire frequently slips about the edges of the inside curing rim and skews in the mold; an off-center tread then resulting from the subsequent vulcanizing operation.

To prevent such undesirable result, a tread centering mechanism is employed in the form of opposed, power actuated, pressure ring units supported on the mold and adapted—in a closed or working position—to span the corresponding open sides of said mold; such units including rings which enter the mold through said open sides and engage the outside of the adjacent and exposed tire beads in a manner to yieldably resist axial separation thereof and to maintain them symmetrical to the central radial plane of the mold during inflation of the inside curing bag.

A tire is placed in, or removed from, a band-type mold —and which is normally vertically disposed—by first reducing the tire diameter by relatively widely axially separating the beads and then moving the tire into or out of the mold from one of its open sides; this operation being accomplished by a device known as a tire spreader, and the use of which requires that the open sides of the mold be unobstructed.

It is therefore another important object of this invention to provide a band-type mold and tread centering mechanism combination wherein the pressure ring units can—while remaining in connection with the mold—be readily moved from the above described working position to an open or clearance position, which permits of unobstructed access to the open sides of the mold, and as necessary to permit a tire to be placed in or removed therefrom.

An additional object of the invention is to provide a band-type mold and tread centering mechanism combination, as in the preceding paragraph, wherein the pressure ring units are hinged to the mold for swinging between said closed or working position and said open or clearance position, but are normally quick-detachably latched in said first named position.

It is also an object of the invention to provide a practical, reliable, and durable band-type mold and tread centering mechanism combination.

These objects are accomplished by means of such structure and relative arrangement of parts as will fully appear by a perusal of the following specification and claims.

In the drawings:

Fig. 1 is a side elevation of a band-type mold and tread centering mechanism combination; the view showing the near pressure ring unit in working position.

Fig. 2 is a top plan view showing both of the pressure ring units in non-working or clearance position.

Fig. 3 is a similar view, but shows said pressure ring units as latched in working position.

Fig. 4 is a diagrammatic view of the valve controlled, fluid pressure conduit system employed in connection with the power cylinders of the pressure ring units.

Fig. 5 is a fragmentary radial section, somewhat diagrammatic, showing the bead engaging rings in retracted position and before inflation of the inside curing bag.

Fig. 6 is a similar view, but shows the bead engaging rings in advanced position preparatory to inflation of said inside curing bag.

Fig. 7 is likewise a similar view, but shows the bead engaging rings again retracted and the inside curing bag as inflated.

Referring now more particularly to the drawings, and to the characters of reference marked thereon, the numeral 1 indicates generally a unitary portable band-type mold which is normally disposed vertically and supported from the bottom by a cradle-like dolly 2 having floor engaging caster wheels 3.

The band-type mold 1 includes a body having full-circle or endless body half sections 4 disposed in mating engagement; such body half sections 4 being normally secured together by a surrounding, releasable clamping ring 5 connected—at its free ends, and under tension—by a latch 6.

The body half sections 4 are formed with radially inwardly projecting skirts 7 whereby said sections define an endless or full-circle tire receiving matrix cavity 8 in the bottom of which are the tread design elements 9.

The band-type mold 1 is heated by suitable means, here shown as steam passages 10 in the body half sections 4, and to which passages steam is fed through fittings 11.

The present invention contemplates, in combination with the band-type mold 1, a tread centering mechanism comprised of pressure ring units, each being indicated generally at 12; such pressure ring units 12 being opposed, with the band-type mold 1 disposed therebetween. Such pressure ring units—which are mounted in connection with the mold 1—are identical in construction, so that a description of one will suffice for both.

Each pressure ring unit 12 normally spans the corresponding open side of the mold 1, and wherein the annular opening is indicated at 13; such unit comprising a central sleeve or hub 14 disposed outwardly of the mold but in coaxial relation thereto.

The hub 14 is formed with a pair of spider arms 15 which diverge in one direction, and another spider arm 16 which extends in the opposite direction. At their free ends the divergent spider arms 15 are formed with bearing bosses 17, each vertically pivotally secured by a bolt 18 in a clevis 19 fixed to and projecting from the adjacent side of the mold 1; the pivot bolts 18 being vertically alined so that the spider comprised of hub 14 and arms 15 and 16 can swing from a closed or working position with the hub 14 coaxially alined with the mold, as in Figs. 1 and 3, to an open or clearance position, as in Fig. 2, and wherein the related side of the mold is then unobstructed.

At its free end the spider arm 16 is formed with a bearing boss 20 which engages in a clevis 21 secured to the adjacent side of the mold; such bearing boss 20 being normally but quick-releasably secured in the clevis 21 by a removable or pull-out pin 22 formed at the upper end with a radial finger 23 adapted for ready hand engagement and manipulation. By merely pulling the pin 22, the spider can be swung from its closed to its open position.

A double acting power cylinder 24 is secured by any suitable means in the hub 14, and such power cylinder includes an inwardly projecting piston rod 25 fitted at its free end with a radial, concentric mounting ring 26 which is supported from said piston rod by a spider 27. The mounting ring 26, which is of relatively small diameter, is fitted with a bead engaging pressure ring 28; the latter being attached to the mounting ring 26 in the manner contemplated in copending application, Serial No. 655,714, filed April 29, 1957.

The bead engaging pressure ring 28 includes an endless flange 29 which radiates from the outer edge portion of the peripheral face of said ring. The pressure ring 28 is prevented from rotating relative to the power cylinder 24 by a guide rod 30 secured to the mounting ring 26 in offset but parallel relation to its axis, and projecting outwardly through a guide 31 on hub 14.

When the power cylinder 24 is contracted, the related pressure ring 28 is disposed axially outwardly of the corresponding annular side opening 13 of the mold 1, but when such cylinder is extended the pressure ring moves through the side opening and into the confines of the mold for the purpose as will hereinafter appear.

The power cylinders 24 preferably—though not necessarily—are simultaneously energized to cause extension or contraction thereof, with resultant advance or retraction, respectively, of the pressure rings 28; this being accomplished—in the present embodiment—by the valve controlled, fluid pressure conduit system shown diagrammatically in Fig. 4.

Such system comprises conduits 32 which lead to the outer ends of the power cylinders 24; conduits 33 which lead to the inner ends of said cylinders; an air pressure supply conduit 34; an air vent 35; and a four-way reversing valve 36—all connected as shown. As this is more or less a conventional reversing system for simultaneously actuated power cylinders, a detailed description is unnecessary, and it suffices to say that the valve 36—in one position—feeds air pressure through the conduits 32 and vents the conduits 33, and—in another position—feeds air pressure to the conduits 33 and vents the conduits 32; all to the end that the power cylinders 24 can be caused to simultaneously extend or contract, at the selection of the operator.

The above described band-type mold and tread centering mechanism combination is used in the following manner:

With the mold 1 supported by the dolly 2, and with the pressure ring units 12 released and swung to their open positions, as shown in Fig. 2, a prepared tire 37, with new tread rubber or camelback C thereon, is introduced into said mold, and from an open side of the latter, by means of a device known as a "tire spreader."

Such a tire spreader relatively widely separates the beads 38 of the tire 37, whereby to materially reduce the outside diameter of the latter, and which permits it to be inserted into the mold from one side; such tire—as released by the spreader—returning to normal diameter and engaging in the tire receiving matrix cavity 8, with the new tread rubber or camelback C lightly engaging the tread design elements 9.

After the tire 37 is introduced into the mold 1 an inside curing bag 39 is placed in the tire and such bag is then backed by an inside curing rim 40. When this has been accomplished, and before the air bag 39 is inflated, the pressure ring units 12 are swung to closed position and are latched in place by the pins 22 (see Fig. 3); the pressure rings 28 being initially retracted (see Fig. 5).

Thereafter, and with the bag 39 remaining deflated, the power cylinders 24 are energized so as to cause them to extend, which advances the pressure rings 28. When this occurs such rings enter the related beads 38, and the flanges 29 abut the outside of such beads; the latter—under the force exerted by the power cylinders 24—being pushed some distance toward each other, and which slightly reduces the diameter of the tire and frees the new tread rubber or camelback C from the tread design elements 9 (see Fig. 6).

Subsequently, the inside curing bag 39 is inflated, and under the influence of the expansion of said bag the crown of the tire—including the new tread rubber or camelback C—is urged radially outwardly into forceful engagement with the tread design elements 9. When this occurs the sidewalls of the tire 37 are pulled, to a certain extent, about the side edges of the inside curing rim 40, which tends to cause the beads 38 to separate, and which they do against the inward but yieldable force exerted by the pressure rings 26. As such yieldable force is equal, the beads 38—while they actually separate—must do so equally; thus remaining symmetrical to the radial center line of the mold. The result is true centering of the tire 37, including the new tread rubber or camelback C, in the matrix cavity 8, so that when the vulcanizing operation is subsequently conducted the vulcanized tread is true on the tire.

After inflation of the inside curing bag 39, and the above described tread centering action of the pressure rings 28, such rings are retracted from the beads (see Fig. 7) by contraction of the power cylinders 24; it being preferred that such pressure rings be clear of the tire beads 38 during the vulcanizing operation.

Thereafter, the tread vulcanizing operation takes place, and when it is completed the pressure ring units 12 are released and swung to their open position; the tire 37, after withdrawal of the rim 40 and bag 39, being removed from the mold 1 by the aforementioned tire spreader, but in the reverse order of its operational steps.

With the described band-type mold and tread centering mechanism combination, tires can be readily and conveniently retreaded, with the new treads properly centered by the pressure ring units 12 which comprise such mechanism, yet with such units readily swingable to an open or out-of-the-way position to permit of unobstructed access to the mold from the sides for the purpose of placing the tire in, or removing it from, said mold.

The word "retreading" as used herein is deemed to include tire tread replacement by what is known in the trade as "top capping" or "full capping."

From the foregoing description it will be readily seen that there has been produced such a band type mold and tread centering mechanism combination as substantially fulfills the objects of the invention, as set forth herein.

While this specification sets forth in detail the present and preferred construction of the band type mold and tread centering mechanism combination, still in practice such deviations therefrom may be resorted to as do not form a departure from the spirit of the invention, as defined by the appended claims.

Having thus described the invention, the following is claimed as new and useful, and upon which Letters Patent are desired:

1. A tread centering mechanism for a full-circle horizontal-axis retreading mold having a body which defines a circular opening having a diameter greater than the bead diameter of a tire in the mold; said mechanism comprising, on each side of the mold, a pressure ring of a size to enter the body opening and arranged for tire bead engagement, a supporting structure for the ring including substantially opposed elements overlying the adjacent side of the body, and means including vertical pins connecting the elements and the body radially out from the mold opening, one at least of the pins being removable.

2. A tread centering mechanism for a full-circle horizontal-axis retreading mold having a body which defines a circular opening having a diameter greater than the bead diameter of a tire in the mold; said mechanism comprising, on each side of the mold, a pressure ring of a size to enter the body opening and arranged for tire bead engagement, a supporting structure for the ring including substantially opposed arms which at their outer ends overlie the adjacent side of the body, a vertical-axis hinge connecting the outer end of one arm and said side of the body radially out from the body opening, and releasable latch means connecting the outer end of the other arm and said side of the body radially out from the mold opening.

3. A tread centering mechanism for a full-circle horizontal-axis retreading mold having a body which defines a circular opening having a diameter greater than the bead diameter of a tire in the mold; said mechanism comprising on each side of the mold, a pressure ring of a size to enter the body opening and arranged for tire bead engagement, a ram connected to the ring and extending axially thereof away from the opposed ring, and a supporting structure for the ram including a tubular hub in which the cylinder of the ram is mounted, a pair of arms radiating from the hub in diverging relation to a horizontal plane centrally of the hub, vertical-axis hinge connections between the outer end of the arms and the adjacent side of the body, another arm projecting radially from the hub in a horizontal plane in opposed relation to the first named arms, and a releasable latch connection between said other arm and the adjacent side of the body.

References Cited in the file of this patent

UNITED STATES PATENTS

| | | |
|---|---|---|
| 2,444,898 | Butterfield | July 6, 1948 |
| 2,672,651 | Smyser | Mar. 23, 1954 |
| 2,712,156 | Potter et al. | July 5, 1955 |
| 2,734,225 | Glynn | Feb. 14, 1956 |

FOREIGN PATENTS

| | | |
|---|---|---|
| 121,039 | Sweden | Mar. 2, 1948 |

OTHER REFERENCES

"Cost Chart," Copyright 1941 by Paul E. Hawkinson Co.